US007876068B2

(12) United States Patent
Faunce et al.

(10) Patent No.: US 7,876,068 B2
(45) Date of Patent: Jan. 25, 2011

(54) BATTERY CHARGE INDICATOR

(75) Inventors: Rita L. Faunce, Algonquin, IL (US); Joseph A. Laurx, Elmhurst, IL (US); Robert F. Wentink, Chicago, IL (US)

(73) Assignee: International Components Corporation, Westchester, IL (US)

( * ) Notice: Subject to any disclaimer, the term of this patent is extended or adjusted under 35 U.S.C. 154(b) by 0 days.

(21) Appl. No.: 10/732,942

(22) Filed: Dec. 11, 2003

(65) Prior Publication Data

US 2005/0088146 A1 Apr. 28, 2005

Related U.S. Application Data

(60) Provisional application No. 60/514,337, filed on Oct. 24, 2003.

(51) Int. Cl.
*H02J 7/00* (2006.01)

(52) U.S. Cl. ...................... 320/132; 324/427

(58) Field of Classification Search ............... 320/132, 320/130, 128, 136, 137, 157, 166, 106, 107, 320/134, 1, 2, 5, 11, 14, 20, 30, 32, 39; 324/436, 324/437, 435; 307/66
See application file for complete search history.

(56) References Cited

U.S. PATENT DOCUMENTS

| 5,172,044 A | * | 12/1992 | Sasaki et al. ............... 320/160 |
| 5,216,371 A | * | 6/1993 | Nagai ......................... 324/428 |
| 5,589,755 A | * | 12/1996 | Kaite et al. .................. 320/160 |
| 5,635,820 A | * | 6/1997 | Park .......................... 320/148 |
| 5,670,862 A |   | 9/1997 | Lewyn ........................ 320/149 |
| 5,764,030 A |   | 6/1998 | Gaza .......................... 320/116 |
| 5,831,412 A | * | 11/1998 | Morioka et al. ............. 320/106 |
| 5,937,622 A | * | 8/1999 | Carrier et al. ................. 56/11.9 |
| 5,994,878 A | * | 11/1999 | Ostergaard et al. .......... 320/132 |
| 6,002,237 A |   | 12/1999 | Gaza .......................... 320/116 |
| 6,057,667 A | * | 5/2000 | Mills .......................... 320/105 |
| 6,172,478 B1 | * | 1/2001 | Leppo et al. ................. 320/116 |
| 6,222,370 B1 | * | 4/2001 | Schousek et al. ............. 324/436 |
| 6,492,792 B1 | * | 12/2002 | Johnson et al. .............. 320/136 |
| 6,580,249 B2 |   | 6/2003 | Yau et al. ..................... 320/122 |
| 6,586,130 B1 |   | 7/2003 | Guiheen et al. ............... 429/92 |
| 6,747,371 B2 | * | 6/2004 | Kotlow et al. ................. 307/66 |
| 6,771,043 B2 | * | 8/2004 | Matsunaga et al. .......... 320/114 |
| 2002/0117996 A1 |   | 8/2002 | Cheng ......................... 320/114 |
| 2003/0137283 A1 | * | 7/2003 | Isomichi et al. ............. 320/162 |

FOREIGN PATENT DOCUMENTS

| JP | 08140281 | * | 11/1994 |
| JP | 11164489 | * | 6/1999 |
| JP | 2002142380 | * | 5/2002 |

* cited by examiner

*Primary Examiner*—Edward Tso
*Assistant Examiner*—Samuel Berhanu
(74) *Attorney, Agent, or Firm*—John S. Paniaguas; Katten Muchin Rosenman LLP

(57) ABSTRACT

The resistors R1 and R2 are applied to terminals 1 and 8, respectively, of the switched-mode power supply 26. These resistors R1 and R2 are current-limiting resistors and function to control the output power and current. A standard buck regulator may be coupled to terminal 5 of the switched-mode power supply 26. The buck regulator includes a diode D7 and an inductor L1. The diode D7 and inductor L1 provide DC rectification and filtering of the high-frequency switch voltage from the switched-mode power supply 26.

7 Claims, 2 Drawing Sheets

BATTERY CHARGE INDICATOR

CROSS-REFERENCE TO RELATED APPLICATIONS

This application claims the benefit of and priority to commonly owned U.S. Provisional Application No. 60/514,337, filed on Oct. 24, 2003.

BACKGROUND OF THE INVENTION

1. Field of the Invention

The present invention relates to a battery state of charge indicator and more particularly to a relatively simple system for sensing a nearly full state of charge of a battery, such as a lithium ion battery, and providing a visual indication of the nearly full state of charge.

2. Description of the Prior Art

Various portable devices and appliances, such as cellular phones, are known to use rechargeable batteries. For example, lithium ion batteries are known to be used in such applications. Battery chargers for such lithium ion batteries are generally known in the art. Examples of such lithium ion battery chargers are disclosed in U.S. Pat. Nos. 5,670,862; 6,586,130 and commonly owned U.S. Pat. Nos. 5,764,030 and 6,002,237. Lithium ion battery chargers are known to operate in both constant current and constant voltage charging modes. A characteristic charging curve for an exemplary lithium ion battery is illustrated in FIG. 1. With such lithium ion batteries, the charging current is determined by the following equation:

$$I_{CHARGE} = \frac{V_{CHARGE} - V_{BATT}}{R_{CHARGER} + R_{BATT}},$$

where
$V_{CHARGE}$=charging voltage of the charger
$V_{BATT}$=battery voltage
$R_{CHARGER}$=resistance of the charger circuit
$R_{BATT}$=resistance of the battery.

With such lithium ion batteries, a constant charging voltage $V_{CHARGE}$ is applied to the battery. As the battery cell voltage $V_{BATT}$ increases, as shown by the solid curve 22, the charging current $I_{CHARGE}$ decreases, as shown by the dashed curve 20, since the circuit resistance ($R_{CHARGER}+R_{BATT}$) is constant. Such lithium ion batteries are nearly fully charged when the charging current drops to a predetermined value.

Because of the relatively long charging time characteristics of such lithium ion batteries, techniques have been developed to attempt to shorten the charging time. For example, one known technique relates to initially increasing the charging current, for example, by increasing the charging voltage. This technique has been found to cause such lithium ion batteries to reach the maximum cell voltage quicker. However, the overall charging time is not known to be reduced by much. U.S. Pat. No. 5,670,862 also relates to a rapid charging technique for lithium ion batteries. The '862 patent discloses a charging system which utilizes compensation of the expected voltage drop for the electrical series resistance of the lithium ion battery in order to shorten charging time. Although the '862 patent purports to reduce the battery charging time to about ½ of the normal charging time, no indication of the various states of charge is provided to the user. As such, users have no way of knowing when the battery is fully charged.

U.S. Patent Application Publication No. U.S. 2002/0117996 A1 discloses a battery charger for a cellular phone. The published patent application discloses an LED indicator that indicates when the battery is fully charged. However, users do not always want to wait until batteries are fully charged. Thus, there is a need for a visual indication system that provides a visual indication to a user of the nearly full state of charge of a battery.

SUMMARY OF THE INVENTION

The present invention relates to relatively simple system sensing a nearly full state of charge of a battery, such as a lithium ion battery, and providing a visual indication of the nearly full state of charge. The system for measuring the nearly full state of charge relies on the charging characteristics of a lithium ion battery. In particular, the system measures the charging current to the battery. When the charging current drops to a level representing, for example, 80% or more of full charge, a visual indication is provided to indicate a near full charge state of the battery.

DESCRIPTION OF THE DRAWINGS

These and other advantages of the present invention will be readily understood with reference to the following specification and attached drawing wherein.

DETAILED DESCRIPTION

Figure 2:
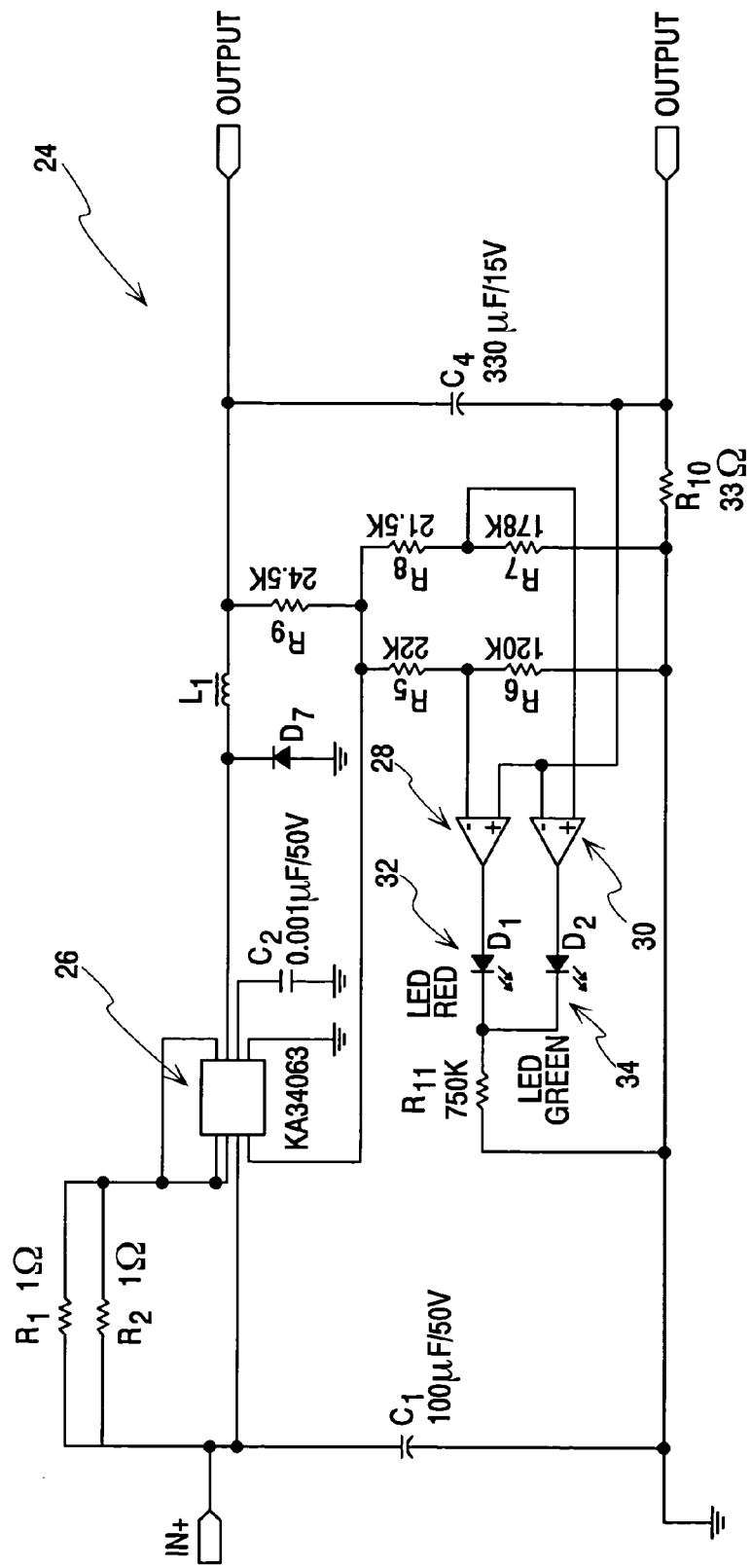
FIG. 2 is a schematic diagram of a battery charger with a visual indication system for indicating a nearly full state of charge of a lithium ion battery in accordance with the present invention.

A battery charger that incorporates the system in accordance with the present invention for sensing and indicating a nearly full state of charge of a battery, such as a lithium ion battery, is illustrated in FIG. 2 and generally identified with the reference numeral 24. As shown in FIG. 2, the battery charger 24 is configured as a DC-DC converter; however, the principles of the present invention are also applicable to AC-DC converters.

The system in accordance with the present invention is particularly useful with lithium ion batteries. Such batteries are known to take almost as long to charge the last 20% as the first 80%. The system provides an indication to the user when the battery is nearly fully charged, for example, 80% or more, utilizing a relatively simple method for sensing battery charge. As such, consumers can take advantage of this information, if desired, and avoid waiting for such batteries to be fully charged.

One embodiment of the system in accordance with the present invention utilizes three color indicators, indicative of three levels of charging of a battery, such as a lithium ion battery. As will be discussed in more detail below, the visual indication system may include two LEDs, which provide three colors if the LED colors are selected as primary colors. For example, red and green LEDs may be provided. In a first state, when the battery cell voltage is relatively low, a red LED is illuminated. In a second state, both the red and a green LED are illuminated to create an orange color. The orange color is used to indicate a transitional state of charge. As will be discussed in more detail below, when the battery is nearly fully charged, the red LED is turned off so that just the green LED is illuminated. The green LED is used to represent a near full state of charge. Although a three-color visual indication system is indicated, the principles of the present invention are also applicable to other visual indicators using either one, two, as well as four or more colors.

Referring to FIG. 2, a battery charger 24 which incorporates a DC-DC converter is shown connected to a cigarette lighter auxiliary (CLA) socket (not shown) in an exemplary embodiment. The CLA socket connects the battery charger 24 to a positive DC power supply, identified as IN+ and ground. A capacitor C1 may be connected between the positive DC power supply IN+ and ground to provide electromagnetic interference filtering to remove noise from the DC source at the CLA socket.

The battery charger 24 may include a power supply 26, such as a switched-mode power supply, for example, a Samsung Model KA34063 or other power supply. The switched-mode power supply 26 may be used to switch and invert the positive DC input into a high-frequency, for example, 40 KHz, PWM signals and to provide feedback to regulate the output voltage, based on feedback from a feedback resistor R9. As shown, the feedback resistor R9 is connected between an output terminal (OUTPUT−) of the battery charger 24 and terminal 5 of the switched-mode power supply 26. The resistor R9 forms a voltage divider with the resistors R5, R6, R7 and R8 to provide an indication of the voltage at the output terminal (OUTPUT+) of the battery charger 24. As such, switched-mode power supply 26 is able to regulate the output voltage at the output terminals OUTPUT+ and OUTPUT−.

The resistors R1 and R2 are applied to terminals 1 and 8, respectively, of the switched-mode power supply 26. These resistors R1 and R2 are current-limiting resistors and function to control the output power and current. A standard buck regulator may be coupled to terminal 5 of the switched-mode power supply 26. The buck regulator includes a diode D7 and an indictor L1. The diode D7 and indictor L1 provide DC rectification and filtering of the high-frequency switch voltage from the switched-mode power supply 26.

The frequency of the switched-mode power supply 36 is controlled by a capacitor C2. The capacitor C2 is connected between terminal 3 of the switched-mode power supply 26 and system ground. Another capacitor, C4, may be connected between the output terminals. The capacitor C4 filters the output and controls the ripple in the output signal.

In accordance with an important aspect of the invention, the battery charger 24 includes a battery charge sensing circuit which includes a pair of operational amplifiers 28 and 30. The operational amplifiers 28 and 30 are used to drive a pair of LEDs 32 and 34, whose cathodes are tied together and connected to system ground by way of a resistor R11. The operational amplifiers 28 and 30 compare the voltage across a current sensing resistor R10 to a reference voltage at pin 5 of the switched-mode power supply 26. In particular, the voltage across the current-sensing resistor R10 is applied to an inverting input of the operational amplifier 30 and a non-inverting input of the operational amplifier 28. A voltage divider formed from the resistors R5 and R6 is applied to the inverting input of the operational amplifier 28. An output from a second voltage divider, formed from the resistors R7 and R8, is applied to the non-inverting input of the operational amplifier 30. The values of the resistors R5/R6 and R7/R8 are selected so that the LEDs 32 and 34 turn on or off as the voltage across the current sensing resistor R10 decreases below predetermined current values.

Figure 1:
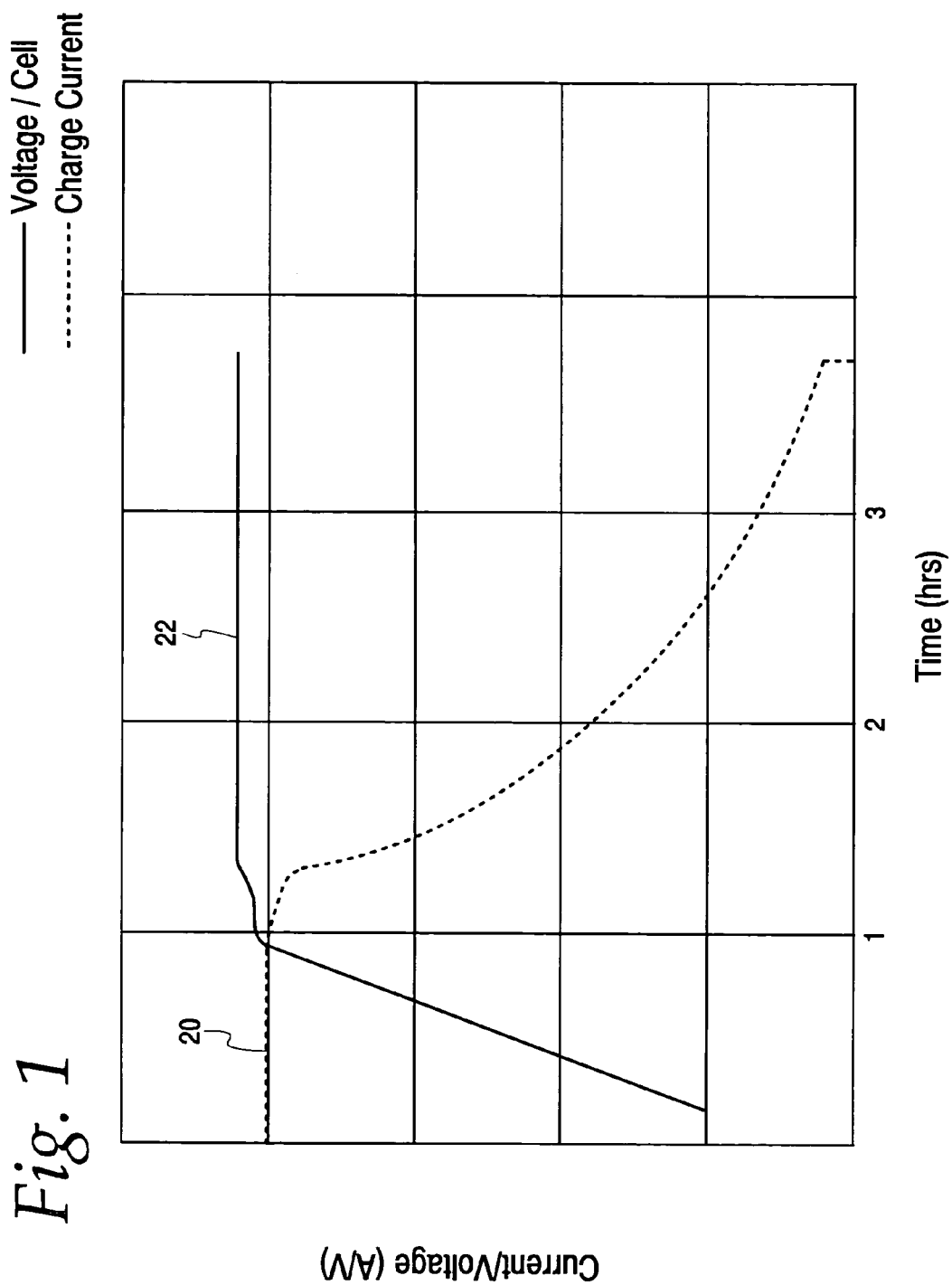
FIG. 1 is a graphical representation of the current/voltage characteristics as a function of time of an exemplary lithium ion battery.

During a first charging stage, a red color, for example, may be used to indicate constant current charging until the cell voltage limit is reached. Once the cell voltage limit is reached, the charging current decreases virtually exponentially, as shown in FIG. 1. In order to indicate the transition from constant current charging, an orange color is used. The orange color is created by illuminating both the red and green LEDs at the same time. The green LED may be driven to start to turn on at a first set point, for example, 200 milliamps. As the charging continues, the charging current continues to decrease. At another set point, for example, 100 milliamps, the red LED may be biased off and the green LED kept on. The second set point may be selected at about an 80% or greater state of charge.

Obviously, many modifications and variations of the present invention are possible in light of the above teachings. Thus, it is to be understood that within the scope of the appended claims, the invention may be practiced otherwise than is specifically described above.

What is claimed and desired to be secured by a Letters Patent of the United States is:

1. A battery charge indicator for sensing and indicating various states of charge of a lithium ion battery, the battery charge indicator comprising:
a current sensing circuit for sensing charging current to said lithium ion battery during a constant current mode of operation and a constant voltage mode of operation and providing a first charge indication signal based upon comparing the magnitude of said charging current with a first predetermined value and generating a first charge indication signal solely as a function of said charging current when said charging current is less than or equal to said first predetermined value, wherein said first predetermined value is representative of a first predetermined charge state representative of an initial state of charge of said lithium ion battery, said current sensing circuit providing a second charge indication signal based upon comparing the magnitude of said charging current with a second predetermined value and generating a second charge indication signal solely as a function of said charging current when said charging current is less than or equal to said second predetermined value, said current sensing circuit providing a third charge indication signal based upon comparing the magnitude of said charging current with a third predetermined value and generating a third charge indication signal in said constant voltage mode of operation solely as a function of said charging current when said charging current is less than or equal to said third predetermined value;
a first indicator responsive to said first charge indication signal for providing an indication when said lithium ion battery is at an initial state of charge;
a second indicator responsive to said second charge indication signal for providing an indication when said lithium ion battery is at a transitional state of charge; and
a third indicator responsive to said third charge indication signal for providing an indication when said lithium ion battery is at a near full state of charge.

2. The battery charge indicator as recited in claim 1, wherein said first indicator includes a first visual indication.

3. The battery charge indicator as recited in claim 2, wherein said first visual indication is a first light emitting diode (LED).

4. The battery charge indicator as recited in claim 1, wherein said second indicator includes a second visual indication.

5. The battery charge indicator as recited in claim 1, wherein said first, second and third indicators comprise two LEDs.

6. The battery charge indicator as recited in claim 5, wherein one of said two LEDs is a red LED and the other of said two LEDs is a green LED and in a first state, said red LED is illuminated and in a second state both of said red and green LEDs are illuminated and in a third state, only said green LED is illuminated.

7. The battery charge indicator as recited in claim 1, wherein said third indicator includes a third visual indication.

* * * * *